(12) United States Patent
Takano et al.

(10) Patent No.: US 11,898,564 B2
(45) Date of Patent: Feb. 13, 2024

(54) AXIAL FLOW BLOWER

(71) Applicant: YAMABIKO CORPORATION, Ohme (JP)

(72) Inventors: Masayuki Takano, Ohme (JP); Yuusuke Kinoshita, Ohme (JP)

(73) Assignee: YAMABIKO CORPORATION, Tokyo (JP)

( * ) Notice: Subject to any disclaimer, the term of this patent is extended or adjusted under 35 U.S.C. 154(b) by 30 days.

(21) Appl. No.: 17/847,845

(22) Filed: Jun. 23, 2022

(65) Prior Publication Data

US 2022/0412364 A1  Dec. 29, 2022

(30) Foreign Application Priority Data

Jun. 25, 2021  (JP) .................................. 2021-105573

(51) Int. Cl.
| | |
|---|---|
| *F04D 19/00* | (2006.01) |
| *F04D 25/06* | (2006.01) |
| *F04D 29/66* | (2006.01) |
| *A01G 20/47* | (2018.01) |
| *F04D 29/54* | (2006.01) |

(52) U.S. Cl.
CPC .......... *F04D 19/002* (2013.01); *A01G 20/47* (2018.02); *F04D 25/06* (2013.01); *F04D 29/545* (2013.01); *F04D 29/664* (2013.01)

(58) Field of Classification Search
CPC .......... F04D 19/00; F04D 19/02; F04D 25/06; F04D 29/545; F04D 29/547; A01G 20/47
See application file for complete search history.

(56) References Cited

U.S. PATENT DOCUMENTS 10,670,048 B2   6/2020  Landen et al.
2009/0038108 A1  2/2009  Shaanan et al.
(Continued)

FOREIGN PATENT DOCUMENTS

| AU | 2021101003 A4 | 4/2021 |
|---|---|---|
| CN | 206246425 U | 6/2017 |

(Continued)

OTHER PUBLICATIONS

Extended European Search Report in Europe Application No. 22180403.2, dated Nov. 14, 2022, 4 pages.

*Primary Examiner* — Kenneth J Hansen
(74) *Attorney, Agent, or Firm* — Crowell & Moring LLP

(57) ABSTRACT

Provided is an axial flow blower capable of improving an intake efficiency even when air is introduced from a plurality of suction openings. An axial flow blower includes a housing including an air blowing passage extending from a plurality of suction openings (lateral suction opening and lower suction opening) to an ejection opening, an electric motor, and an air blowing fan that blows air from the plurality of suction openings (lateral suction opening and lower suction opening) toward the ejection opening. An air blowing guide member is provided closer to the plurality of suction openings (lateral suction opening and lower suction opening) than to the air blowing fan, inside of the plurality of suction openings (lateral suction opening and lower suction opening). The air blowing guide member guides air introduced into the air blowing passage from the plurality of suction openings (lateral suction opening and lower suction opening) toward the air blowing fan.

8 Claims, 7 Drawing Sheets

(56) References Cited

U.S. PATENT DOCUMENTS

| | | |
|---|---|---|
| 2015/0211535 A1 | 7/2015 | Kodato et al. |
| 2016/0238010 A1 | 8/2016 | Schaffler et al. |
| 2018/0291930 A1 | 10/2018 | Pellenc |
| 2020/0137966 A1 | 5/2020 | Suzuki |
| 2020/0221651 A1 | 7/2020 | Klingler et al. |

FOREIGN PATENT DOCUMENTS

| | | | |
|---|---|---|---|
| CN | 207235677 U | 4/2018 | |
| GB | 2012362 * | 7/1979 | ........... F04D 25/084 |
| GB | 2012362 A | 7/1979 | |
| JP | 2014-037818 A | 2/2014 | |
| JP | 2020-076355 A | 5/2020 | |

* cited by examiner

AXIAL FLOW BLOWER

RELATED APPLICATIONS

This application claims priority to Japanese Patent Application No. 2021-105573, filed on Jun. 25, 2021, the entire content of which is incorporated herein by reference.

BACKGROUND OF THE INVENTION

1. Field of the Invention

The present invention relates to an axial flow blower.

2. Description of the Related Art

An axial flow blower (air blower) for blowing away fallen leaves and dust by ejection of a high speed air flow includes a housing including an air blowing passage, a motor case disposed in the air blowing passage, an electric motor (hereinafter simply referred to as a motor) housed in the motor case, and an air blowing fan coupled to a driving portion of the motor. Such an axial flow blower is configured to generate an air flow from a suction opening toward an ejection opening of the air blowing passage by rotating the air blowing fan with a driving force of the motor (see, for example, JP 2020-076355 A).

Conventional axial flow blowers include the one in which only one suction opening is formed at a rear end portion (a position opposite to an air blowing fan) of a housing to introduce outside air (air) into an air blowing passage (see, for example, JP 2020-076355 A, U.S. Ser. No. 10/670,048 B, and JP 2014-037818 A). In another axial flow blower, a suction opening is circumferentially formed on the perimeter of the rear end portion of the housing (i.e., the perimeter of the air blowing fan) to introduce outside air (air) into the air blowing passage, and a guide member (guide plate) extending from the rear of the suction opening to the air blowing fan is arranged to guide the outside air from the circumferentially formed suction opening to the air blowing fan (see, for example, US 2020/0221651 A).

SUMMARY OF THE INVENTION

Generally, a motor-driven axial flow blower has a smaller air blowing force (flow speed) than that of a centrifugal blower, and thus requires a suction opening that is as large as possible to ensure intake air. This may increase the overall size of the blower (see, for example, JP 2014-037818 A).

To avoid this, suction openings from which air is introduced may be provided at a plurality of positions. However, this may cause an intake loss by the collision of the flows of air introduced into the air blowing passage. In addition, although it is considered that the one disclosed in US 2020/0221651 A, for example, can suppress the collision of the flows of air as much as possible, a significantly large guide member extending from the rear of the suction opening to the air blowing fan need be arranged, and this may unfortunately cause problems, such as increase in intake loss due to a narrow air blowing passage, increase in size of the blower, and the like.

The present invention has been made in view of the foregoing, and provides an axial flow blower capable of improving an intake efficiency even when air is introduced from a plurality of suction openings.

In order to solve the above problem, an axial flow blower according to the present invention includes a housing including a plurality of suction openings, an ejection opening, and an air blowing passage extending from the plurality of suction openings to the ejection opening, an electric motor disposed within the housing, and an air blowing fan coupled to the electric motor and rotated within the air blowing passage with a driving force of the electric motor so as to blow air from the plurality of suction openings toward the ejection opening. An air blowing guide member is provided closer to the plurality of suction openings than to the air blowing fan, inside of the plurality of suction openings, the air blowing guide member being adapted to guide air introduced into the air blowing passage from the plurality of suction openings toward the air blowing fan.

In a preferred aspect, the air blowing guide member may include a plurality of through-holes.

In another preferred aspect, a chamber may be provided on one side of the air blowing guide member opposite to the air blowing fan.

In still another preferred aspect, the chamber may be defined by a space having a predetermined size or may include a sound absorbing member.

In yet another preferred aspect, the air blowing guide member may have a conical shape, and an outer peripheral surface of the conical shape may serve as a guide surface that guides air introduced into the air blowing passage from the plurality of suction openings toward the air blowing fan.

In yet another preferred aspect, a top portion of the conical shape may be disposed at a position facing a rotation axis of the air blowing fan.

In yet another preferred aspect, the air blowing guide member may be attached such that an upstream end portion thereof is located inside of a suction opening formed on a lateral surface of the housing.

In further preferred aspect, the plurality of suction openings may be formed at a plurality of positions of the housing around a rotation axis of the air blowing fan.

According to the present invention, it is possible to improve an intake efficiency even when air is introduced from a plurality of suction openings by providing an air blowing guide member closer to the plurality of suction openings (i.e., on the upstream side of the air flow) than to the air blowing fan.

DETAILED DESCRIPTION OF THE PREFERRED EMBODIMENTS

Hereinafter, one embodiment of the present invention will be described in detail with reference to the drawings. In this specification, an air suction side (i.e., an operator side) will be referred to as a rear side or a proximal end side, and an air ejection side (i.e., a side opposite to the operator side) will be referred to as a front side or a distal end side. A side including a handle gripped by the operator will be referred to as an upper side, and a side opposite to this will be referred to as a lower side.

Figure 1:
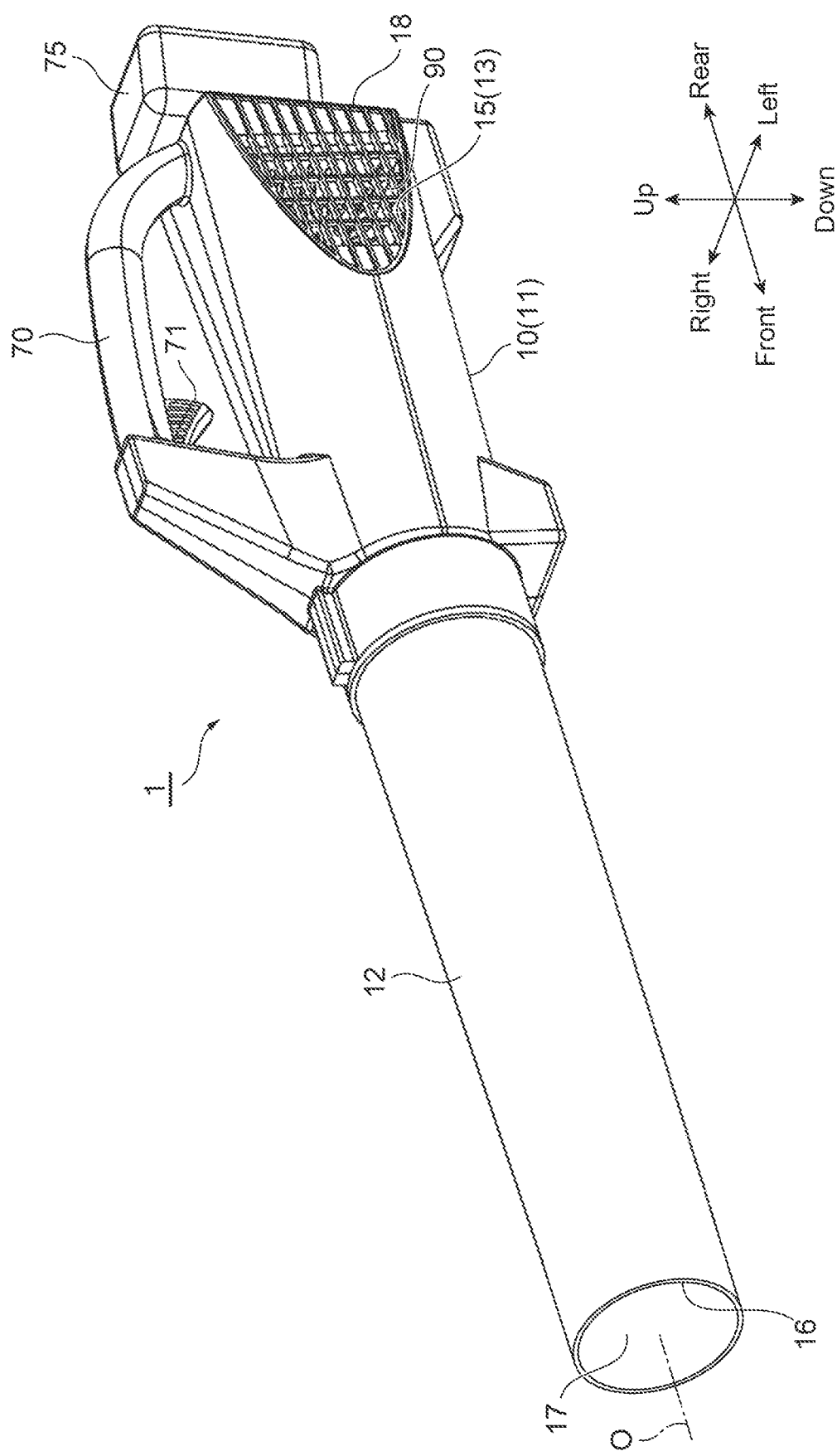
FIG. 1 is an overall perspective view showing an axial flow blower according to one embodiment of the present invention as seen from the upper side.
Figure 2:
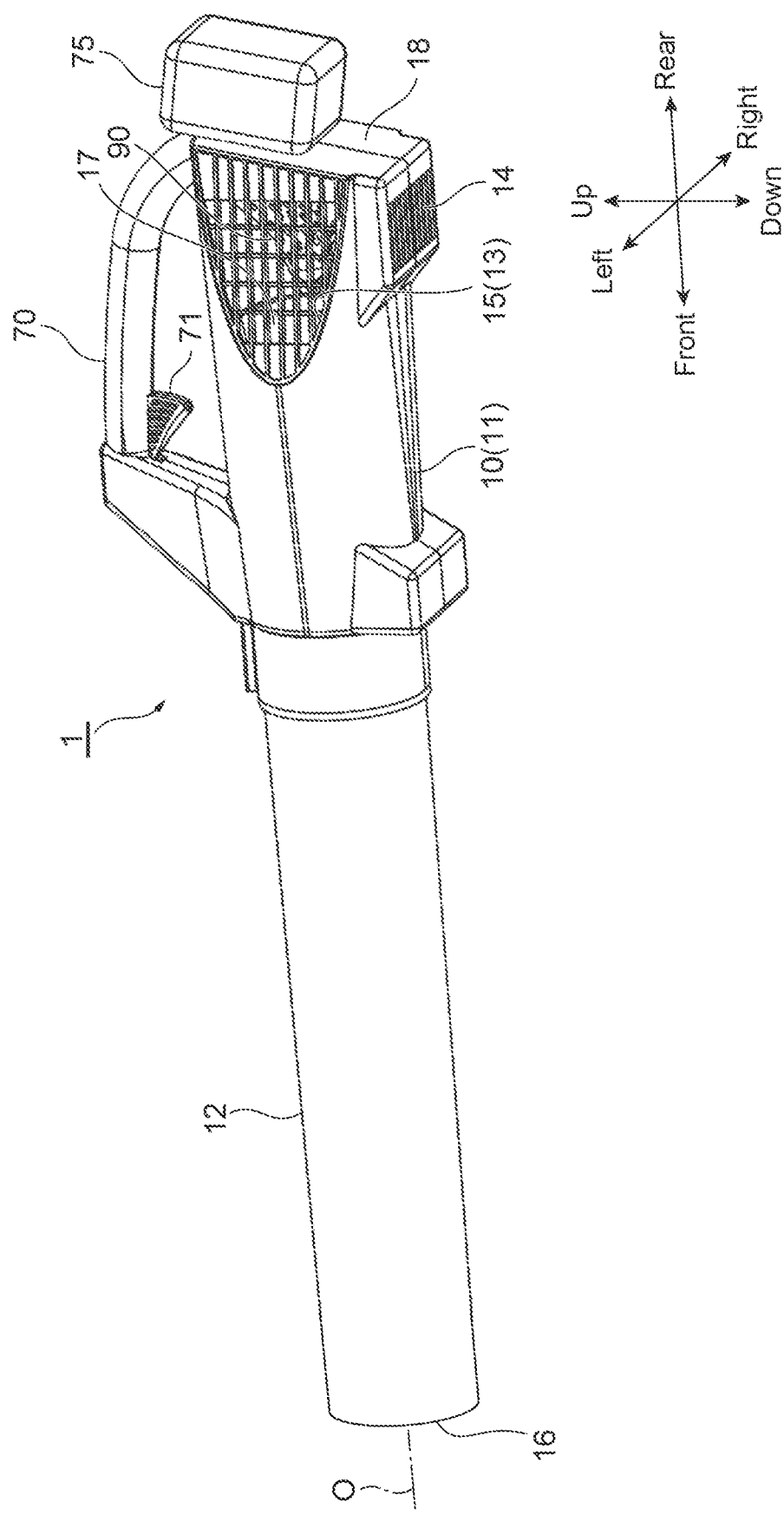
FIG. 2 is an overall perspective view showing the axial flow blower according to one embodiment of the present invention as seen from the lower side.
Figure 3:
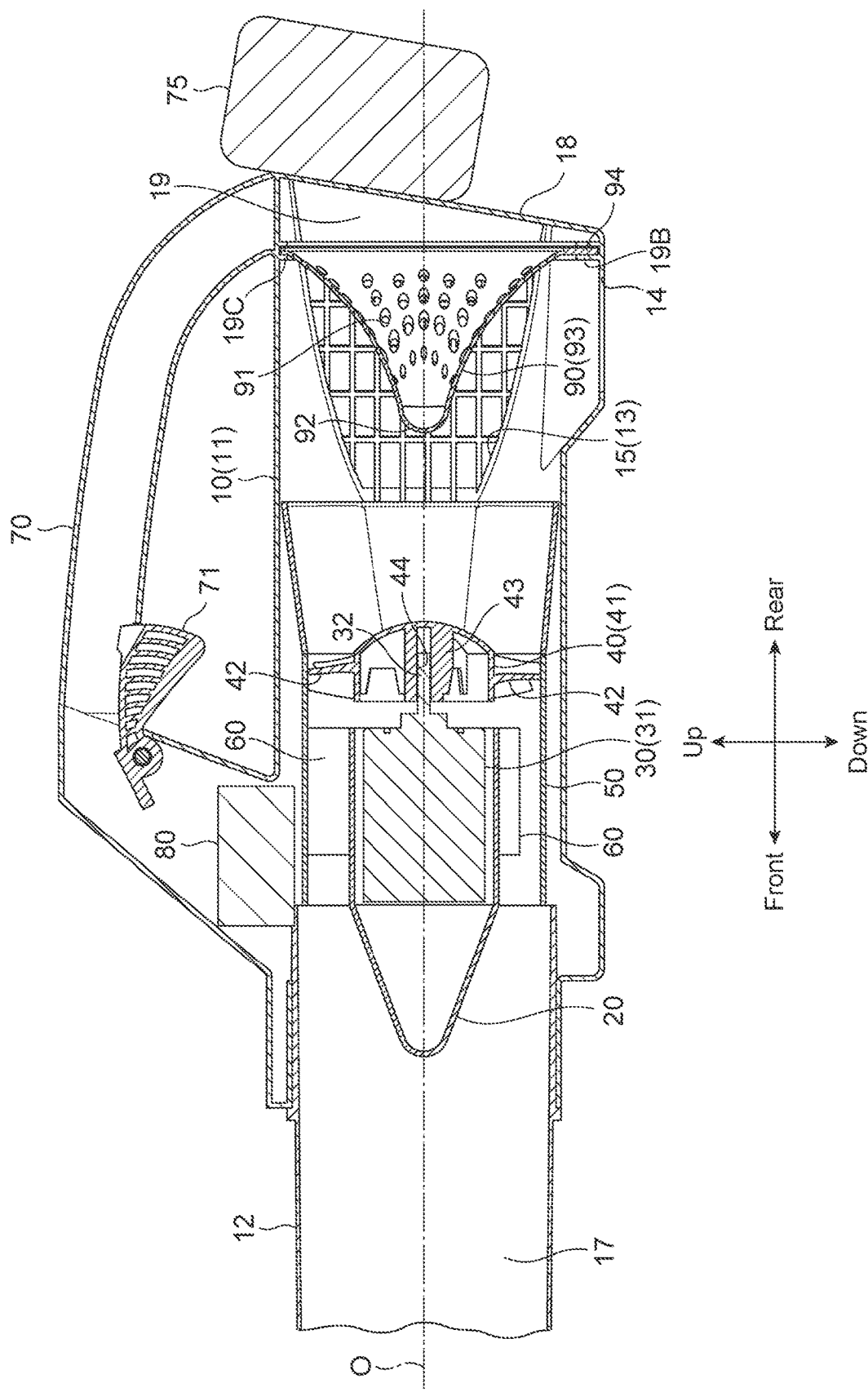
FIG. 3 is a vertical cross-sectional view showing a driving portion of the axial flow blower according to one embodiment of the present invention.
Figure 4:
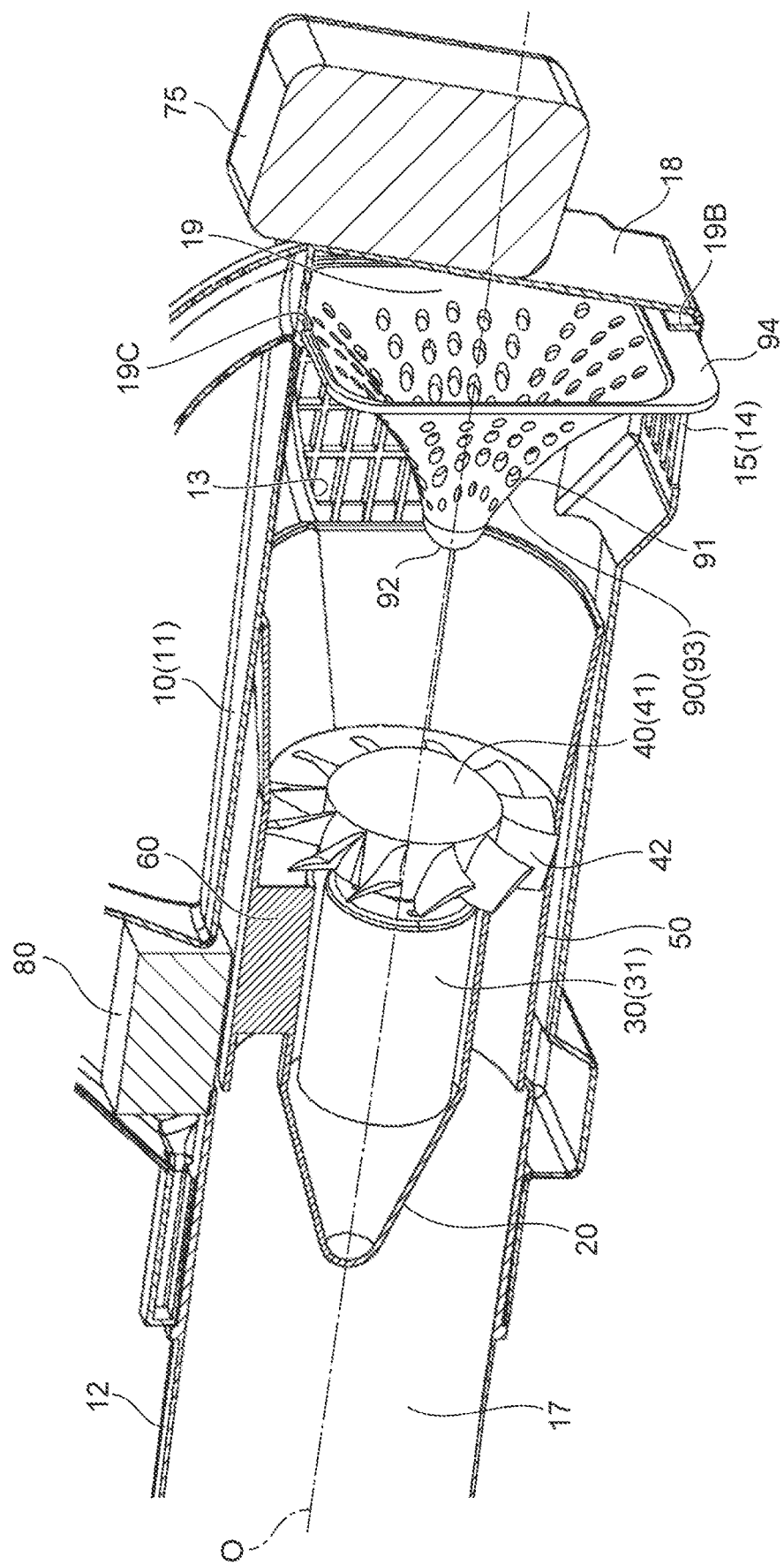
FIG. 4 is a vertical cross-sectional perspective view showing the driving portion of the axial flow blower according to one embodiment of the present invention.

As shown in FIG. 1 and FIG. 2, an axial flow blower 1 of the present embodiment includes a housing 10 in which an air blowing passage 17 extending from a suction opening 15 to an ejection opening 16 is formed. As shown in FIG. 3 and FIG. 4, the housing 10 includes a motor case 20, a motor 30, an air blowing fan 40 coupled to the motor 30, and a flow directing plate 60 disposed in the air blowing passage 17.

By rotating the air blowing fan 40 within the air blowing passage 17 with a driving force of the motor 30, the axial flow blower 1 generates a high speed air flow from the suction opening 15 toward the ejection opening 16 and discharges the air flow to the outside from the ejection opening 16. The operator can blow away fallen leaves and dust by directing the air flow from the ejection opening 16 toward the ground while holding the axial flow blower 1.

The housing 10 includes a main body portion 11 and a blow-out pipe 12 that protrudes frontward from the main body portion 11.

The main body portion 11 is a resin tubular body or box body extending in the front-rear direction and having a front end face that is open. The right and left side surfaces and lower surface of the rear portion of the main body portion 11 each have the suction opening 15 having a plurality of slit holes. Hereinafter, the suction opening 15 formed on each of the right and left surfaces (side walls) of the rear portion of the main body portion 11, through which outside air (air) is introduced from the lateral side into the main body portion 11 (air blowing passage 17), may be referred to as a lateral suction opening 13, and the suction opening 15 formed on the bottom surface (bottom wall) of the rear portion of the main body portion 11, through which outside air (air) is introduced from the lower side into the main body portion 11 (air blowing passage 17), may be referred to as a lower suction opening 14. In the present embodiment, the rear end face of the main body portion 11 (i.e., the rear end portion of the air blowing passage 17) is closed by a rear wall 18 (without a suction opening) that is formed into a rectangular shape.

The blow-out pipe 12 is a resin cylindrical member (straight pipe) extending in the front-rear direction. The rear portion of the blow-out pipe 12 is inserted into and attached to the opening on the front side of the main body portion 11. The front portion of the blow-out pipe 12 protrudes frontward from the opening on the front side of the main body portion 11. The opening (distal opening) on the front side of the blow-out pipe 12 forms the ejection opening 16.

As shown in FIG. 3 and FIG. 4, an outer cylindrical body 50 is formed within the main body portion 11 at a central portion. The outer cylindrical body 50 is a resin cylindrical member extending in the front-rear direction. The front portion of the outer cylindrical body 50 extends straight in the front-rear direction (with a constant diameter in the front-rear direction), and is formed to have a slightly smaller diameter than that of the rear end portion (proximal end portion) of the blow-out pipe 12. The rear portion of the outer cylindrical body 50 is tapered to have a diameter gradually expanded from the front side toward the rear side. The rear end portion of the outer cylindrical body 50 is formed to have a slightly larger diameter than that of the rear end portion (proximal end portion) of the blow-out pipe 12.

The front edge portion (the opening on the front end face) of the outer cylindrical body 50 extends to the rear edge portion of the blow-out pipe 12. Further, the outer surface of the rear edge portion (the opening on the rear end face) of the outer cylindrical body 50 is in contact with the inner surface of the rear portion of the main body portion 11. That is, the outer cylindrical body 50 is disposed between the blow-out pipe 12 and the suction opening 15 formed in the rear portion of the main body portion 11.

Herein, the blow-out pipe 12 and the outer cylindrical body 50 are concentrically arranged such that the central axis of the blow-out pipe 12 matches with the central axis of the outer cylindrical body 50.

Thus, the air blowing passage 17 is defined by the internal space of the blow-out pipe 12, the outer cylindrical body 50, and the rear portion of the main body portion 11. The air blowing passage 17 is an air communication passage extending substantially straight in the front-rear direction from the suction opening 15 to the ejection opening 16.

The motor case 20 is a resin container disposed within the housing 10. The motor case 20 is a cylindrical member and is disposed in the central portion (on the rotation axis of the air blowing fan 40 described later) of the air blowing passage 17. The rear end face of the motor case 20 is open in a circular shape, and the front end portion of the motor case 20 is closed in a conical shape.

The motor case 20 is disposed in the central portion of the front portion of the outer cylindrical body 50. The front portion (conical portion) of the motor case 20 protrudes frontward of the front end face of the outer cylindrical body 50. As shown in FIG. 3 and FIG. 4, the motor case 20 is supported by a plurality of flow directing plates 60 in the central portion of the outer cylindrical body 50.

The flow directing plate 60 is provided between the inner surface of the front portion of the outer cylindrical body 50 and the outer surface of the motor case 20. The flow directing plate 60 is a rectangular plate-like member made of resin extending in a radial direction of the air blowing passage 17. The inner end portion of the flow directing plate 60 is connected to the outer peripheral surface of the motor case 20. Further, the outer end portion of the flow directing plate 60 is connected to the inner peripheral surface of the front portion of the outer cylindrical body 50. In other words, the flow directing plate 60 is a support member provided between the inner surface of the air blowing passage 17 and the outer surface of the motor case 20.

The flow directing plate 60 directs an air flow within the air blowing passage 17 (more specifically, an air flow downstream of the air blowing fan 40, blown forward by the air blowing fan 40 described later). This flow directing plate 60 is also referred to as a stationary blade. In the present embodiment, the plurality of (five in the illustrated example) flow directing plates 60 is disposed at regular intervals in a circumferential direction of the outer cylindrical body 50.

The motor case 20, the flow directing plates 60, and the outer cylindrical body 50 of the present embodiment are formed integrally as a unitary component. However, the motor case 20, the flow directing plates 60, and the outer cylindrical body 50 may be formed as separate components and assembled together.

As shown in FIG. 3 and FIG. 4, the motor 30 is an electrically-driven motor and is housed in the motor case 20. The motor 30 is disposed in the central portion (on the rotation axis of the air blowing fan 40 described later) of the air blowing passage 17 (the outer cylindrical body 50 and the motor case 20). The motor 30 is configured such that, with current supplied to a coil of the main body portion 31, a rotating shaft portion 32 provided in the main body portion 31 in a protruding manner rotates about an axis O.

The main body portion 31 is fixed within the motor case 20. In a state where the main body portion 31 is fixed within the motor case 20, the rotating shaft portion 32 protrudes rearward of the rear end face of the motor case 20.

The air blowing fan 40 is disposed behind the motor case 20, inside of the front portion of the outer cylindrical body 50. The air blowing fan 40 includes a coupling portion 41 and a plurality of blades 42.

The coupling portion 41 is a short cylindrical member, and is formed to have a diameter substantially equal to that of the motor case 20. The rear end face of the coupling portion 41 is closed by a spherical surface (i.e., in a dome shape), and the front end face of the coupling portion 41 is open in a circular shape. The central portion of the coupling portion 41 includes a boss 43, and the boss 43 includes an insertion hole 44 into which the rotating shaft portion 32 of the motor 30 is inserted. The coupling portion 41 is fixed to the rotating shaft portion 32 of the motor 30 by fitting the rotating shaft portion 32 of the motor 30 into the insertion hole 44 of the coupling portion 41.

In addition, while rotating relative to the motor case 20, the coupling portion 41 forms a portion of the motor case 20 as a rear case of the motor case 20.

In the axial flow blower 1 of the present embodiment, the plurality of blades 42 is disposed (provided in a protruding manner) on the outer peripheral surface of the coupling portion 41. In the present embodiment, the plurality of (12 in the illustrated example) blades 42 is disposed at regular intervals in the circumferential direction of the coupling portion 41. Driving the motor 30 to rotate the rotating shaft portion 32 and the air blowing fan 40 about the axis O allows each of the blades 42 to blow air from the rear side (upstream side) toward the front side (downstream side) within the air blowing passage 17. That is, in the axial flow blower 1, as shown in FIG. 3 and FIG. 4, when the air blowing fan 40 is rotated within the air blowing passage 17 with a driving force of the motor 30, a high speed air flow is generated from the suction opening 15 on the upstream side toward the ejection opening 16 on the downstream side. The blade 42 of the air blowing fan 40 is also referred to as a moving blade.

In the present embodiment, the motor 30 (or the rotating shaft portion 32 thereof) and the air blowing fan 40 are disposed with the rotation axis O being along the front-rear direction, and thus the rotation axis O of the motor 30 (or the rotating shaft portion 32 thereof) and the air blowing fan 40 matches with the central axis of the blow-out pipe 12, the outer cylindrical body 50, and the motor case 20. The air blowing passage 17 defined by the blow-out pipe 12, the outer cylindrical body 50, and the like extends substantially straight in the direction along the rotation axis O of the air blowing fan 40.

In the axial flow blower 1, as shown in FIG. 1, FIG. 2, and FIG. 3, a handle 70 is provided on the upper surface of the main body portion 11. The handle 70 is a columnar member extending in the front-rear direction and is gripped by the operator. The front end portion and the rear end portion of the handle 70 are respectively coupled to the front portion and the rear end portion on the upper surface of the main body portion 11. The front portion of the handle 70 is provided with a throttle lever 71 serving as control means, with which the operator increases or decreases the rotational speed of the rotating shaft portion 32 of the motor 30 while gripping the handle 70.

A control case 80 is formed inside of the front end portion (a portion coupled to the main body portion 11) of the handle 70. The control case 80 houses a control unit (not shown) that controls driving of the motor 30, that is, rotation of the air blowing fan 40, based on a signal from the throttle lever 71. The control unit is connected to a power source cable (not shown) connected to a battery 75 as a power source. In addition, the control unit and the throttle lever 71 are connected to each other via a signal cable (not shown) provided within the handle 70. The control unit is connected to a power supply cable (not shown) connected to the motor 30.

As shown in FIG. 1, FIG. 2, and FIG. 3, in the axial flow blower 1, the battery 75 serving as a power source for the control unit and the like is mounted on the rear surface of the main body portion 11 (i.e., the upper portion of the rear wall 18 that forms the rear surface of the main body portion 11).

To blow away fallen leaves and dust with the axial flow blower 1, the operator grips the handle 70 with a hand to carry the axial flow blower 1. Then, the operator controls the throttle lever 71 of the handle 70 to rotate the air blowing fan 40 so as to generate a high speed air flow within the air blowing passage 17 and introduce outside air (air) (from the lateral and lower sides) from the suction openings 15 (the lateral suction openings 13 and the lower suction opening 14) into the air blowing passage 17, and directs the air flow from the ejection opening 16 toward the ground.

In the axial flow blower 1 having the above configuration, the suction openings 15 (the lateral suction openings 13 and the lower suction opening 14) are provided at a plurality of positions of the housing 10 (or the main body portion 11 thereof) around the rotation axis O of the air blowing fan 40. When the flows of air introduced into the air blowing passage 17 from the suction openings 15 (the lateral suction openings 13 and the lower suction opening 14) provided at the plurality of positions collide with each other, an intake loss may occur.

Then, in addition to the above configuration, the axial flow blower 1 of the present embodiment includes an air blowing guide member 90 that is provided in the housing 10 in order to improve the intake efficiency even when air is introduced from the plurality of suction openings 15 (the lateral suction openings 13 and the lower suction opening 14). This air blowing guide member 90 is a member that guides the air introduced into the air blowing passage 17 from the lateral suction openings 13 and the lower suction opening 14 toward the air blowing fan 40. In the present embodiment, the air blowing guide member 90 is a resin member having a smooth conical shape that is tapered toward the front side, and is disposed in the central portion of the air blowing passage 17.

Figure 6:
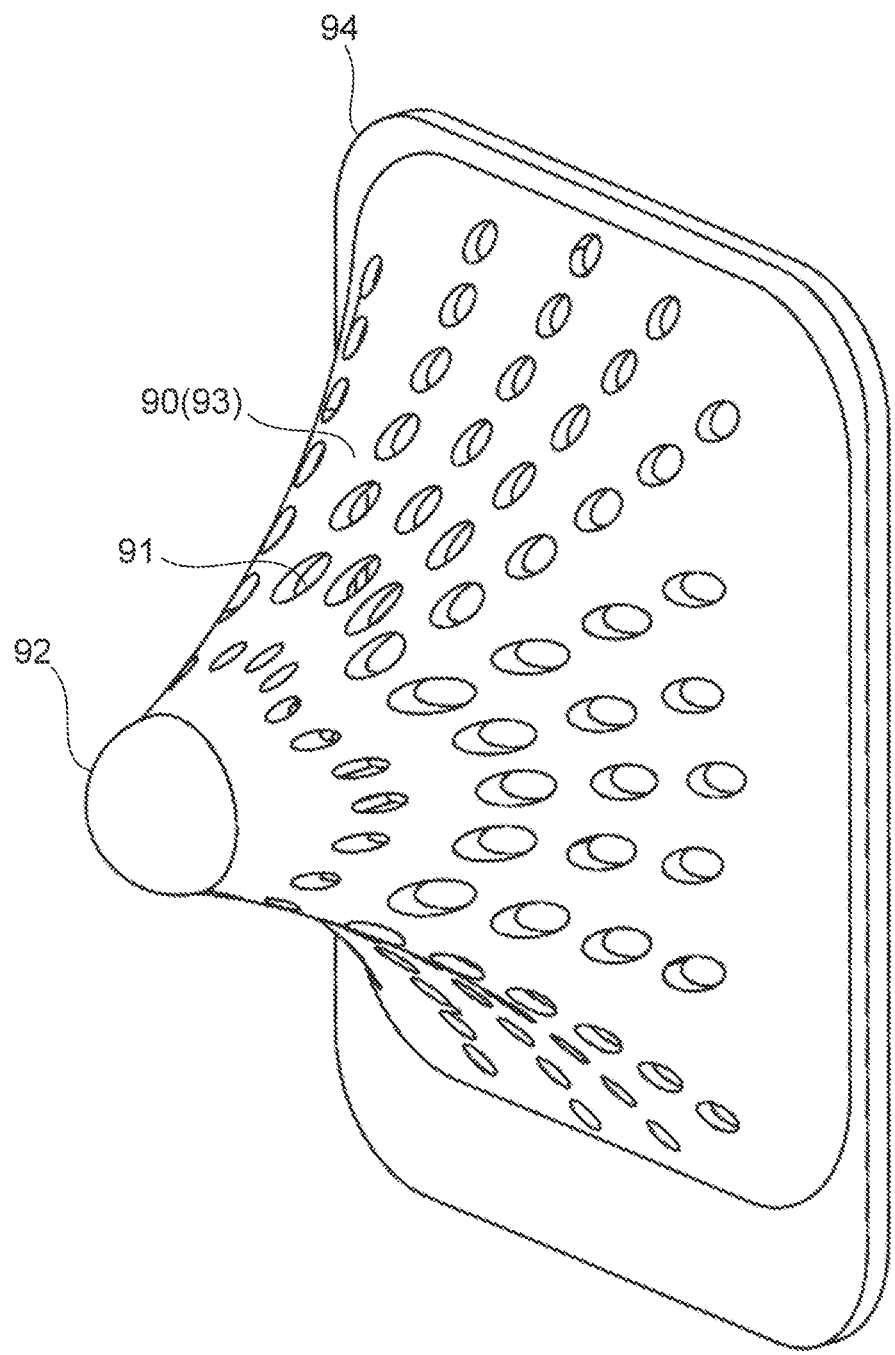
FIG. 6 is a perspective view showing the air blowing guide member of the axial flow blower according to one embodiment of the present invention.
Figure 7:
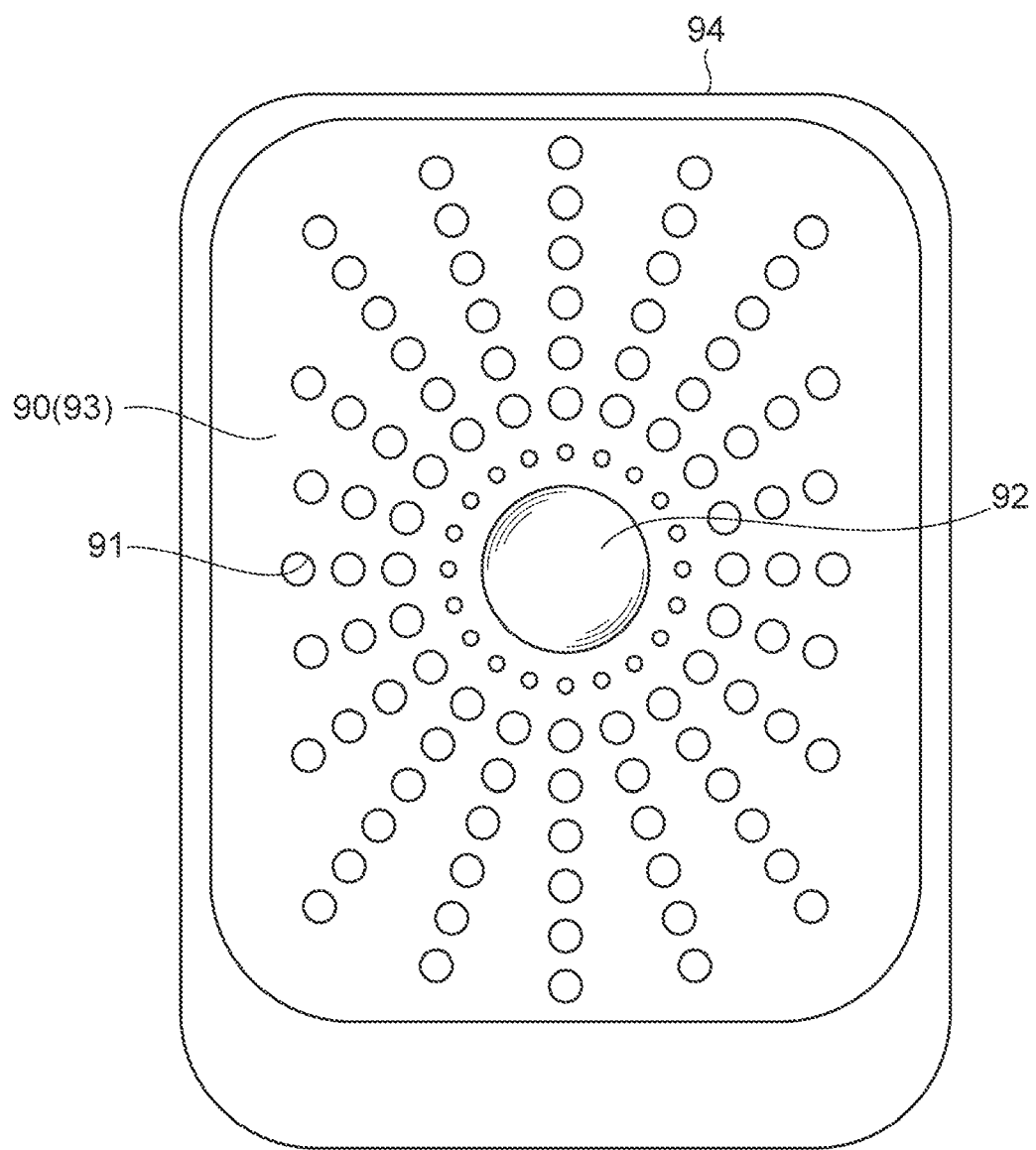
FIG. 7 is a front view of the air blowing guide member of the axial flow blower according to one embodiment of the present invention as seen from the front side (downstream side).

A central portion (top portion) 92 of the air blowing guide member 90 is closed by a hemispherical surface, and a rear end portion of the air blowing guide member 90 is formed into a rectangular frame shape, in which the lower part is wider than the upper part and the lateral part (see, in particular, FIG. 6 and FIG. 7). That is, the hemispherical central portion (top portion) 92 of the air blowing guide member 90 is disposed at a position facing the rotation axis O of the air blowing fan 40.

The air blowing guide member 90 is disposed behind the air blowing fan 40, inside of the lateral suction openings 13 and the lower suction opening 14 such that the central portion (top portion) 92 protrudes frontward. That is, the air blowing guide member 90 is disposed inside of the lateral suction openings 13 and the lower suction opening 14, on the upstream side of the air flow with respect to the air blowing fan 40.

An outer peripheral surface 93 having a conical shape of the air blowing guide member 90 serves as a guide surface that guides the air introduced into the air blowing passage 17 from the lateral suction openings 13 and the lower suction opening 14 toward the air blowing fan 40. More specifically, the conical outer peripheral surface 93 of the air blowing guide member 90 guides the air introduced into the air blowing passage 17 in a direction along the rotation axis O of the air blowing fan 40 and to the vicinity of the rotation axis O of the air blowing fan 40. It should be noted that in the present embodiment, the conical outer peripheral surface 93 of the air blowing guide member 90 is slightly curved inwardly (recessed), but may not necessarily be curved or may be curved outwardly.

In addition, the air blowing guide member 90 (or the conical portion thereof) has a plurality of through-holes 91. In the present embodiment, the plurality of through-holes 91 is formed in a radial direction (i.e., radially from the center). In addition, due to the size of a space, the through-holes in the innermost position are smaller than the other through-holes. However, it is needless to mention that the number, shape, arrangement, distribution, and the like of the through-holes 91 are not limited to the illustrated example.

The rectangular frame-shaped rear end portion (upstream end portion) of the air blowing guide member 90 is in contact with the inner surface of the rear end portion of the main body portion 11 of the housing 10. The rectangular frame-shaped rear end portion of the air blowing guide member 90 serves as an attachment portion 94 for attaching the air blowing guide member 90 to the inside of the housing 10. On the bottom surface of the main body portion 11 of the housing 10, behind the lower suction opening 14, a recessed lower fitting portion 19B is formed, and on the upper surface of the main body portion 11 of the housing 10, opposite to the lower fitting portion 19B, a recessed upper fitting portion 19C is formed. The air blowing guide member 90 is fixedly attached to the inside of the housing 10 by inserting the upper and lower sides of the rear end portion (attachment portion 94) of the air blowing guide member 90 into the upper fitting portion 19C and the lower fitting portion 19B. It should be noted it is needless to mention that that the configuration of attachment of the air blowing guide member 90 is not limited to the illustrated example.

In the present embodiment, the air blowing guide member 90 is attached such that the front end portion (downstream end portion) and the rear end portion (attachment portion 94) are positioned inside of the lateral suction openings 13 formed on the lateral surfaces of the main body portion 11 of the housing 10 (i.e., positioned on the front side with respect to the rear end of the lateral suction openings 13).

Figure 5:
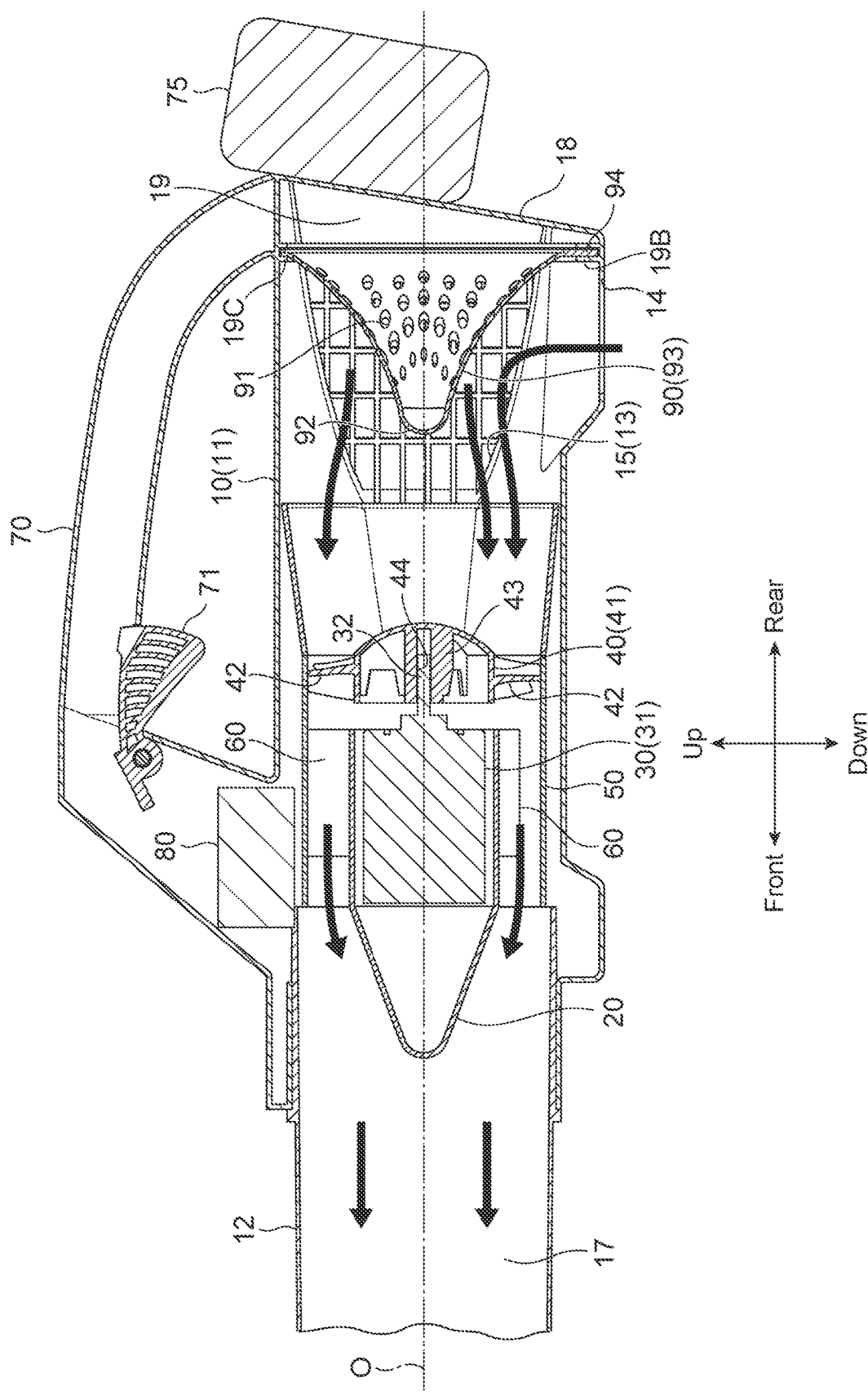
FIG. 5 is a vertical cross-sectional view used for illustrating an air flow around an air blowing guide member of the axial flow blower according to one embodiment of the present invention.

In a state where the air blowing guide member 90 is fixedly attached to the inside of the housing 10, a chamber 19 is formed behind the air blowing guide member 90 (see FIG. 3, FIG. 4, and FIG. 5). That is, within the housing 10, the chamber 19 is formed on one side of the air blowing guide member 90 opposite to the air blowing fan 40. In the present embodiment, the chamber 19 is defined by a space having a predetermined size. However, the chamber 19 may include a sound absorbing member.

As described above, by rotating the air blowing fan 40 within the air blowing passage 17 with a driving force of the motor 30, the axial flow blower 1 generates a high speed air flow from the suction opening 15 toward the ejection opening 16, introduces outside air (air) (from the lateral and lower sides) into the air blowing passage 17 from the suction openings 15 (the lateral suction openings 13 and the lower suction opening 14), and discharges the air flow to the outside from the ejection opening 16. At this time, the air introduced into the air blowing passage 17 from the lateral suction openings 13 and the air introduced into the air blowing passage 17 from the lower suction opening 14 each collide with the conical outer peripheral surface 93 of the air blowing guide member 90 (before they collide with each other) and change their directions to the frontward direction, and then are blown toward the air blowing fan 40 (in a direction along the rotation axis O of the air blowing fan 40 and to the vicinity of the rotation axis O of the air blowing fan 40) (see FIG. 5). Since the flows of air introduced into the air blowing passage 17 from the suction openings 15 (the lateral suction openings 13 and the lower suction opening 14) provided at the plurality of positions will not collide with each other, it is possible to suppress occurrence of an intake loss and improve the intake efficiency.

As described above, the axial flow blower 1 of the present embodiment includes the air blowing guide member 90 that guides the air introduced into the air blowing passage 17 from the plurality of suction openings 15 (the lateral suction openings 13 and the lower suction opening 14) toward the air blowing fan 40, the air blowing guide member 90 being disposed closer to the plurality of suction openings 15 (the lateral suction openings 13 and the lower suction opening 14) than to the air blowing fan 40, inside of the plurality of suction openings 15 (the lateral suction openings 13 and the lower suction opening 14). Since the air blowing guide member 90 is disposed closer to the plurality of suction openings 15 (the lateral suction openings 13 and the lower suction opening 14) than to the air blowing fan 40, inside of the plurality of suction openings 15 (the lateral suction openings 13 and the lower suction opening 14), and the air introduced into the air blowing passage 17 (from the lateral and lower sides) from the plurality of suction openings 15 (the lateral suction openings 13 and the lower suction opening 14) is guided and directed, it is possible to suppress an intake loss and generation of sound as compared to a conventional blower without an air blowing guide member, for example. In addition, since the air blowing guide member 90 only need be disposed closer to the plurality of suction openings 15 (the lateral suction openings 13 and the lower suction opening 14) than to the air blowing fan 40, inside of the plurality of suction openings 15 (the lateral suction openings 13 and the lower suction opening 14), and need not be as large as the guide member described in US 2020/0221651 A, for example, it is possible to easily ensure the air blowing passage 17 and suppress an intake loss, and also suppress increase in size of the axial flow blower 1.

In addition, the air blowing guide member 90 includes the plurality of through-holes 91. With this configuration, the sound passing through the through-holes 91 is changed to thermal energy and absorbed, and thus the operation sound of the electric motor 30 and the air blowing fan 40 can be absorbed, and generation of sound can be effectively suppressed.

In addition, the chamber 19 is provided on one side of the air blowing guide member 90 opposite to the air blowing fan 40. With this configuration, the chamber 19 plays a role of a sound absorption chamber, and thus the operation sound of the electric motor 30 and the air blowing fan 40 can be absorbed, and generation of sound can be effectively suppressed (together with the effect of the above-described through-holes 91).

In addition, the air blowing guide member 90 has a conical shape, and the outer peripheral surface of the conical shape serves as a guide surface that guides the air introduced into the air blowing passage 17 from the plurality of suction openings 15 (the lateral suction openings 13 and the lower suction opening 14) toward the air blowing fan 40. With this configuration, a simple design of the air blowing guide member 90 having a smooth conical shape can effectively suppress an intake loss and generation of sound.

In addition, a top portion of the conical shape of the air blowing guide member 90 is disposed at a position facing the rotation axis O of the air blowing fan 40. With this configuration, a simple design of the air blowing guide member 90 allows the air introduced into the air blowing passage 17 from the plurality of suction openings 15 (the lateral suction openings 13 and the lower suction opening 14) to be guided and directed in a direction along the rotation axis O of the air blowing fan 40 and to the vicinity of the rotation axis O of the air blowing fan 40, and thus can effectively suppress an intake loss and generation of sound.

In addition, the air blowing guide member 90 is attached such that the upstream end portion thereof is located inside of the suction openings (lateral suction openings 13) formed on the lateral surfaces of the housing 10 (or the main body portion 11 thereof). With this configuration, a simple design of the air blowing guide member 90 allows the air blowing guide member 90 to be attached to an appropriate position while suppressing increase in size of the axial flow blower 1.

In addition, the plurality of suction openings 15 (the lateral suction openings 13 and the lower suction opening 14) is formed at the plurality of positions of the housing 10 around the rotation axis O of the air blowing fan 40. Even in this case, it is possible to effectively suppress an intake loss and generation of sound.

As described above, according to the axial flow blower 1 of the present embodiment, since the air blowing guide member 90 is disposed closer to the plurality of suction openings 15 (i.e., on the upstream side of the air flow) than to the air blowing fan 40, it is possible to improve the intake efficiency even when air is introduced from the plurality of suction openings 15.

Although one example of the embodiment of the present invention has been described above, the present invention is not limited thereto, and changes can be made appropriately within the spirit and scope of the present invention.

For example, in the axial flow blower 1 of the present embodiment, the blow-out pipe 12, which is detachable, is attached to the opening of the main body portion 11. However, the blow-out pipe 12 may not necessarily be detachable, and may be formed integrally with the main body portion 11.

What is claimed is:

1. An axial flow blower comprising:
a housing including a plurality of suction openings, an ejection opening, and an air blowing passage extending in an axial direction from the plurality of suction openings to the ejection opening;
an electric motor disposed within the housing; and
an air blowing fan coupled to the electric motor and rotated within the air blowing passage with a driving force of the electric motor so as to blow air from the plurality of suction openings toward the ejection opening,
wherein an air blowing guide member is provided, radially inside of the plurality of suction openings, closer in the axial direction to the plurality of suction openings than to the air blowing fan, the air blowing guide member being adapted to guide air introduced into the air blowing passage from the plurality of suction openings toward the air blowing fan, and wherein the air blowing guide member includes a plurality of through-holes.

2. The axial flow blower according to claim 1, wherein a chamber is provided on one side of the air blowing guide member opposite in the axial direction to the air blowing fan.

3. The axial flow blower according to claim 2, wherein the chamber is defined by a space having a predetermined size.

4. The axial flow blower according to claim 1, wherein the air blowing guide member has a conical shape, and an outer peripheral surface of the conical shape serves as a guide surface that guides air introduced into the air blowing passage from the plurality of suction openings toward the air blowing fan.

5. The axial flow blower according to claim 4, wherein a top portion of the conical shape is disposed to face the air blowing fan in the axial direction.

6. The axial flow blower according to claim 4, wherein the air blowing guide member is formed to have an upstream end portion located radially inside of the plurality of suction openings formed in the housing.

7. The axial flow blower according to claim 1, wherein the plurality of suction openings is formed at a plurality of positions of the housing around a rotation axis of the air blowing fan.

8. The axial flow blower according to claim 2, wherein the chamber includes a sound absorbing member.

\* \* \* \* \*